(12) United States Patent
Lindbo

(10) Patent No.: US 11,833,451 B2
(45) Date of Patent: Dec. 5, 2023

(54) COMPACT EXTRACTABLE SELF-CONTAINED DECANTER ASSEMBLY

(71) Applicant: Glen D. Lindbo, Honolulu, HI (US)

(72) Inventor: Glen D. Lindbo, Honolulu, HI (US)

( * ) Notice: Subject to any disclaimer, the term of this patent is extended or adjusted under 35 U.S.C. 154(b) by 185 days.

(21) Appl. No.: 17/499,657

(22) Filed: Oct. 12, 2021

(65) Prior Publication Data

US 2023/0116139 A1    Apr. 13, 2023

(51) Int. Cl.
*B01D 21/24* (2006.01)
*B01D 21/00* (2006.01)
*B01D 21/30* (2006.01)
*C02F 3/12* (2023.01)

(52) U.S. Cl.
CPC ..... *B01D 21/2444* (2013.01); *B01D 21/0012* (2013.01); *B01D 21/307* (2013.01); *C02F 3/12* (2013.01)

(58) Field of Classification Search
CPC .. C02F 2203/006; C02F 2209/42; C02F 3/12; C02F 3/308; C02F 2303/24; B01D 21/2444; B01D 21/0012; B01D 21/307; Y02W 10/10
See application file for complete search history.

(56) References Cited

U.S. PATENT DOCUMENTS

| | | | | |
|---|---|---|---|---|
| 5,384,049 A | * | 1/1995 | Murphy | B01D 21/02 210/519 |
| 6,303,026 B1 | * | 10/2001 | Lindbo | C02F 3/02 210/220 |
| 6,372,137 B1 | * | 4/2002 | Bounds | C02F 3/103 210/605 |
| 6,773,606 B2 | * | 8/2004 | Wilkins | B01D 35/027 210/411 |
| 6,792,628 B1 | * | 9/2004 | Humphrey | A01K 1/0121 4/300 |

FOREIGN PATENT DOCUMENTS

WO    WO-2020106133 A1 *    5/2020

* cited by examiner

*Primary Examiner* — Bradley R Spies
*Assistant Examiner* — Jeannie McDermott
(74) *Attorney, Agent, or Firm* — Martin E. Hsia; Keri Ann K. S. Krzykowski

(57) ABSTRACT

A compact extractable self-contained decanter that is sealed for powered suction of supernatant from a wastewater tank without clogging from filters.

10 Claims, 5 Drawing Sheets

COMPACT EXTRACTABLE SELF-CONTAINED DECANTER ASSEMBLY

TECHNICAL FIELD

The present invention relates to a compact self-contained decanter assembly for use in decanting fluids (such as supernatant from wastewater treatment) from tanks, which is extractable through access openings of the tank.

BACKGROUND ART

As described in more detail below, the activated sludge process for treating wastewater conventionally uses multiple separate basins to accomplish the following steps: inflow of wastewater (influent); aeration of the influent; settling of solids in the influent; withdrawal of the liquid (commonly called supernatant or effluent) located above the settled solids and below any floating surface scum or foam (decanting); and filtration of the supernatant or effluent, leaving behind only solid waste (sludge) that can be disposed of separately. This process is a very reliable and proven method of wastewater treatment, but unfortunately uses a substantial amount of tankage, equipment, and energy.

Land and energy costs have risen considerably, and will continue to do so in the future. In order to conserve land and energy, it is desirable to perform multiple treatment steps of the activated sludge process in a single basin, that is, to aerate, settle, and decant supernatant or effluent from a single tank or basin, as described in more detail below. The primary obstacle to accomplishing this has been the need for a separate basin, and mechanical equipment, to divert and hold influent during the settling and decanting steps, so as not to upset the settling and decanting steps with incoming influent while these steps are being performed. Attempts have been made to accept influent on a continuous basis (even during settling and decanting), but usually at the cost of increased mechanical equipment and maintenance.

Tanks for containing or treating fluids, including wastewater tanks, are of varying sizes, and usually have one or more access openings above the highest fluid level when filled (usually at the top) that vary in size and shape, with most openings being circular, but other openings being square or of other shapes.

Wastewater and other tanks are often buried underground, or are otherwise difficult or impossible to access from outside, except through the access openings. Wastewater and other tanks may or may not be large enough for a person to go through the access opening to perform maintenance or other tasks on the tank.

Treatment of fluids in a tank often involves several steps. For example, treatment of wastewater includes several steps, usually at least one or more of settling, aerobic processing (aeration of the wastewater while in the tank, so oxygen breathing microorganisms can digest the materials in the wastewater), and anaerobic or anoxic processing (with no or low oxygen or air in the water, so microorganisms that do not breathe oxygen can digest the materials in the wastewater), although not necessarily sequentially or in this order. As part of, between, during, or after, one or more of these steps, a fluid (called the supernatant or effluent) is decanted (drawn off) from the wastewater, without disturbing settled layers underneath (which settled layers may be liquid, solid or both).

The surface of the wastewater being treated also usually contains floating impurities, such as foam generated by aeration, or oils or greases, so it is necessary to decant the supernatant from below the surface of the wastewater as well, but above the settled layers.

The device that draws in the supernatant is called the decanter, and includes a decanter intake through which the supernatant is drawn in, the pump, the motor for the pump, and any housing for the pump and motor. Because the decanter must draw in the supernatant from below the surface of the wastewater, at least the decanter intake must be submerged under the surface of the fluid, which usually means at least part of the decanter is also below the surface, which makes the decanter difficult to remove and service from the access opening at the top of the tank, which may be the only access.

As noted above, the various steps in performing wastewater treatment are usually performed in separate tanks, or in a tank that has been divided into separate chambers, with each separate tank or chamber performing one or more steps. For simplicity, hereafter, "tank" shall also include "chamber" or "basin" or any of their synonyms.

However, there is an installed base of thousands or millions of existing wastewater tanks that use only one tank, that perform only one or two treatment steps, such as septic tanks, which only perform settling, or only perform settling and aeration, and then decant the supernatant as effluent to a leaching field. This incompletely treated effluent creates environmental contamination, so laws have been passed requiring upgrading or phasing out of septic tanks and other mechanisms that incompletely treat wastewater.

Also, usually pumps and their motors are inside a tank, but connected to plumbing that is external to the tank, making the pump very difficult to access and service, because of the need to disconnect and reconnect the pump from the external plumbing.

The motors for pumps in wastewater treatment systems also need to be cooled in order to maximize their service lives. This cooling is usually accomplished by flowing water (usually the supernatant) around the motor for the pump. However, if water flowing around the motor is stagnant or does not flow quickly enough, the motor is not sufficiently cooled and its service life is shortened, and therefore the motor needs to be replaced more frequently. But as noted above, pumps are often inside the tank and connected by plumbing that is outside the tank, so replacing motors in the pumps is often difficult and involved.

Further, in many wastewater treatment systems (such as systems with a pump connected to an open tank or open basin), the water that flows around and cools the motor is drawn into the decanter intake only using ambient water pressure, which is the difference in water pressure between the surface of the water and the decanter intake. This difference in water pressure is commonly called the "head", will vary depending on the level of water in the tank, and limits the volume of water that can reach the pump. If insufficient water reaches the pump, the pump will pump air (cavitation) instead of water. Cavitation will determine whether the wastewater system can operate—if the pump would pump air instead of water, then the system cannot operate to process wastewater.

In many wastewater systems, the decanter is in a housing inside the tank and the interior of the housing is not in direct fluid communication with the exterior of the housing, to avoid mixing supernatant in the interior of the housing with the untreated wastewater outside the housing. Thus, switches with floats (called float switches) are activated and deactivated based on the supernatant level inside the housing to avoid cavitation, and to determine whether the wastewater level is appropriate for a particular step in the process. Float switches usually have a float on a pivoted member, so that, as the water level changes, the pivoted member pivots, which pivoting then triggers a switch.

But because the float switches are in the interior of the housing, floating on supernatant that has been taken in through the decanter intake, and not in direct fluid communication with the exterior of the housing, the wastewater levels inside the housing could be very different from the wastewater levels inside the tank (but outside the housing), so that the system may not perform the correct steps for the wastewater levels inside the tank at the right times, or may not perform those steps efficiently or effectively. Also, because the float switches are mounted inside the housing, the size of the housing is increased.

Moreover, after being drawn through the decanter intake into the decanter, the supernatant is often filtered using filters inside the decanter, so that the volume of supernatant flowing around the motor is determined by the volume of supernatant flowing through the filters, which reduces the motor's service life if the filters are partially or completely clogged or blocked. In this patent, a filter is considered to be different from a mesh screen, because a mesh screen is a single layer of crossing wires or threads defining openings through the mesh screen having a certain substantially uniform size and shape, whereas a filter has multiple layers. Multiple layers of a mesh screen are also considered to be a filter.

Thus there is a need for a system that allows retrofitting of single chambers or single tanks (or other tanks that only incompletely treat wastewater), to allow more steps of treatment to occur in the single chamber or single tank.

There is also a need for a system that allows for easy servicing of pumps and their motors in wastewater tanks.

There is also a need for a system that allows easy removal and servicing of the decanter, which must be at least partially submerged under the surface of the fluid in the tank so that the decanter intake is under the surface, despite the tank being only accessible through small access openings, usually in the top.

There is also a need for a system in which the volume of supernatant flowing around the motor is not limited by the varying ambient water pressure (head) between the decanter intake and the surface of the wastewater, or by the volume of wastewater flowing through filters inside the decanter.

There is also a need for a system which is at least partially self-cleaning, to reduce the frequency of necessary maintenance.

U.S. Pat. No. 4,439,323 to Ball, incorporated herein by reference, discloses a submersible pump encircled by an encircling filter element, which is itself encircled by a housing, and located within a septic tank immersed in waste water. The housing is impervious to water except through apertures located in the vertical sidewalls, to allow only water from the cleanest layer to enter into the housing and contact the filter. The encircling filter has a much larger surface area than the discharge pipe so that sufficient filtered waste water is available for discharge even when the filter becomes substantially blocked.

U.S. Pat. No. 5,492,635 to Ball, incorporated herein by reference, discloses a specially designed filter that includes multiple discreet filters having a total increased filter surface area in an attempt to extend the longevity of the filter. This filter includes multiple discreet filters in an attempt to expand the time needed between cleaning maintenance operations on the pump system. This filter design attempts to decrease the number of times the water treatment system is stopped and the pump housing is opened and cleaned in order to remove the build up of solids from the filter and the bottom of the housing.

U.S. Pat. No. 5,985,139 to Zoeller, incorporated herein by reference, discloses a filtering system within a filter housing, a vertical tubular element secured to the outside of the housing in communication with unfiltered effluent in the tank and with an opening in the bottom or side, and a pump for pumping filtered effluent through the filtering system.

U.S. Pat. No. 6,303,026 B1 to Lindbo, incorporated herein by reference, discloses a wastewater treatment tank with influent gates and a pre-react zone director with an outwardly flared lower portion to enhance laminar flow and minimize disturbance of a settled sludge blanket, allowing the sludge to act as a natural biological filter.

U.S. Pat. No. 6,423,214 B1 to Lindbo, incorporated herein by reference, discloses a device for decanting supernatant from below a liquid's surface.

U.S. Pat. No. 7,069,655 B2 to Lindbo, incorporated herein by reference, discloses a device and process for vertically extracting diffusers from a wastewater treatment tank.

U.S. Pat. No. 7,526,848 B2 to Lindbo, incorporated herein by reference, discloses a process for vertically extracting diffusers from a wastewater treatment tank.

U.S. Pat. No. 6,372,137 B1 to Bounds, incorporated herein by reference, discloses a wastewater treatment system which flows substantially all of its liquid effluent through an aerobic filter, with the majority of the filtrate returned to the septic tank for denitrification followed by further recirculation through the aerobic filter.

DISCLOSURE OF THE INVENTION

In a first presently preferred embodiment, the present invention is a compact decanter assembly extractable through an access opening in a tank for a fluid, for decanting a supernatant from below a surface of the fluid and above a settled layer in the fluid. The access opening has a maximum dimension. When the tank is in use, the surface of the fluid in the tank fluctuates in an operating range between a high fluid level and a bottom fluid level. The assembly has a housing having a bottom, a hollow interior, a top opening leading into a top portion of the interior, and a riser port leading into the interior. The housing is removably mountable in an operating position to an interior portion of the tank. A removable cover is configured to close the top opening to form an airtight seal. A decanter riser is in fluid communication with the hollow interior of the housing through the riser port. A decanter intake is in fluid communication with the decanter riser, and the decanter intake is positioned between the high fluid level and the bottom fluid level when the housing is mounted to the interior surface of the tank. When in an extraction orientation, the housing, the decanter riser and the decanter intake have a maximum combined dimension that is less than the maximum dimension of the access opening and are configured to be extractable though the access opening. A pump having a pump motor is removably placed inside the hollow interior of the housing. The pump is in disconnectable fluid communication at an outlet with a discharge line extending watertightly through the cover outside the housing, and the pump is in fluid communication with the interior of the housing at an inlet that is above the pump motor when the pump motor is placed in the housing and the housing is mounted in the operating position. When the housing is mounted in the operating position to the interior portion of the tank and the cover sealingly closes the top opening and the pump is activated, the pump creates a vacuum in the sealed hollow interior that sucks the supernatant through the decanter intake, the decanter riser, the decanter port, the interior of the housing, and in through the inlet, without going through a filter, resulting in a decanter unfiltered fluid, and then pumps the decanter unfiltered fluid out the outlet and into the discharge line and outside the housing, at a rate that is independent of the hydrostatic pressure between the decanter intake and the level of the fluid.

In another embodiment, the invention comprises a device to treat influent in a tank having a bottom and an access opening. The access opening has a maximum dimension. When the tank is in use, the surface of the influent in the tank fluctuates between a high influent level and a bottom influent level. An influent gate housing having a bottom portion is mounted in the tank to receive the influent. A lateral outward lip attached to the bottom portion extends substantially completely around the influent gate housing. A pre-react zone director has a lower portion at least partially surrounding the influent gate housing. The pre-react zone director defines a main react zone inside the tank, but outside the pre-react zone director. The lower portion of the pre-react zone director is spaced apart from the bottom of the tank and defines a contact zone between the lower portion and the bottom. The pre-react zone director directs flow of the influent in a laminar fashion through the contact zone and into the main react zone. The lower portion of the pre-react zone director comprises a flap, wherein the flap is an angled lip extending around the lower portion of the pre-react zone director. In this manner, the influent avoids disturbing any settling sludge in the main react zone and forms a supernatant by filtering through the settling sludge. Thus, settling, aerobic processing, anaerobic processing, and filtering are all performed in the tank. Further, a compact decanter assembly extractable through the access opening is used, which comprises a housing having a bottom, a hollow interior, a top opening leading into a top portion of the interior, and a riser port leading into the interior. The housing is removably mountable in an operating position to an interior portion of the tank. A removable cover is configured to close the top opening to form an airtight seal. There is a decanter riser in fluid communication with the hollow interior of the housing through the riser port. A decanter intake in fluid communication with the decanter riser is positioned below the bottom fluid level when the housing is mounted to the interior surface of the tank. When in an extraction orientation, the housing, the decanter riser and the decanter intake have a maximum combined dimension that is less than the maximum dimension of the access opening and are configured to be extractable though the access opening. A pump having a pump motor is removably placed inside the hollow interior of the housing. The pump is in disconnectable fluid communication at an outlet with a discharge line extending watertightly through the cover outside the housing. The pump is in fluid communication with the interior of the housing at an inlet that is above the pump motor when the pump motor is placed in the housing and the housing is mounted in the operating position. When the housing is mounted to the interior portion of the tank and the cover sealingly closes the top opening and the pump is activated, the pump creates a vacuum in the sealed hollow interior that sucks the fluid through the decanter intake, the decanter riser, the decanter port, the interior of the housing, and in through the inlet, without going through a filter, resulting in a decanter unfiltered fluid and then pumps the decanter unfiltered fluid out the outlet and into the discharge line and outside the housing, at a rate that is independent of the hydrostatic pressure between the decanter intake and the level of the fluid.

In another preferred embodiment, the decanter intake has a single layer vertical screen.

In another preferred embodiment, the removable cover is attached over the top opening of the housing by a nonscrew quick release watertight coupling.

In another preferred embodiment, float switches to detect water levels in the tank are mounted on the housing.

BEST MODE FOR CARRYING OUT THE INVENTION

Figure 1:
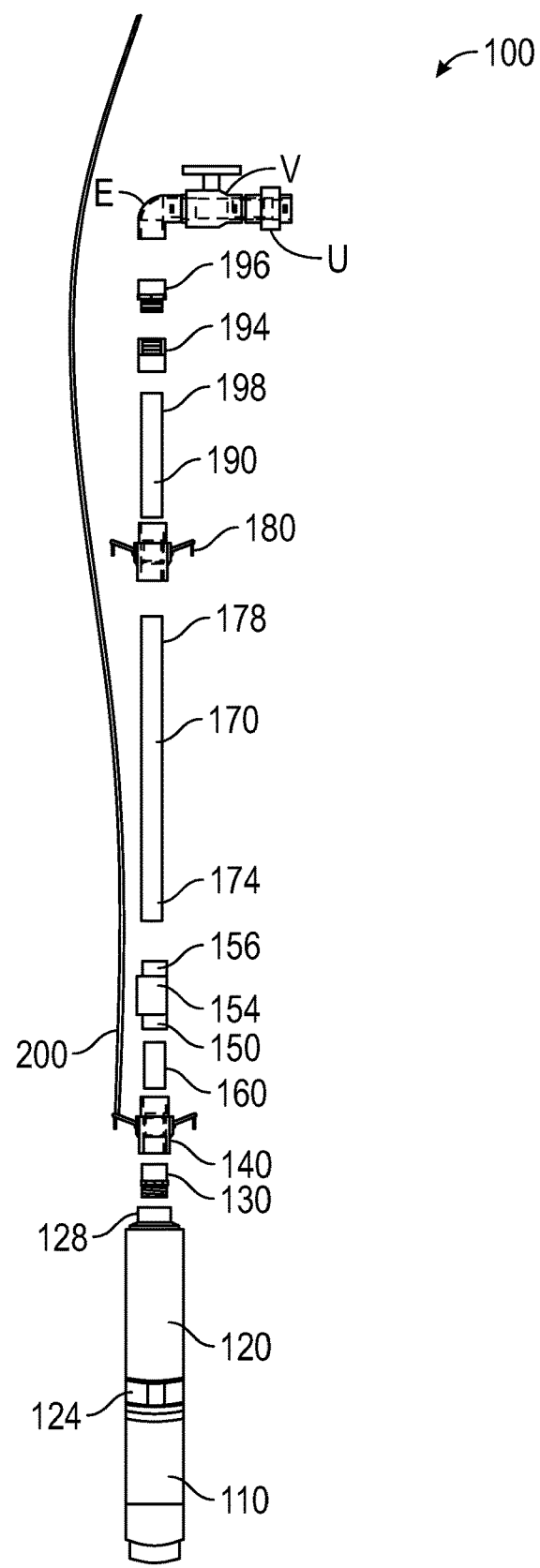
FIG. 1 is a side elevational exploded view of the interior components of a presently preferred embodiment of the interior components of a compact, extractable, self-contained decanter according to the present invention.

The presently preferred best mode for practicing the present invention is illustrated by way of example in FIG. 1, which is a side elevational exploded view of the interior components 100 of a presently preferred embodiment of a compact, extractable, self-contained decanter according to the present invention. A pump motor 110 powers a pump 120 that is mounted on top of the pump motor 110. The pump 120 has a pump inlet 124 and a pump outlet 128. Optionally, there may be a factory-installed small mesh screen in front of the pump inlet 124.

Preferably, a lower quick disconnect device 140 connects the pump outlet 128 to the inlet 150 of a check valve 154, to prevent supernatant from flowing backwards when the motor 110 is turned off. If the inlet of the lower quick disconnect device 140 has a smaller diameter than the pump outlet 128, a reducing bushing 130 can be interposed to connect the pump outlet 128 to the inlet of the lower quick disconnect device 140. Similarly, if desired, a short connecting pipe 160 can be interposed between the outlet of the lower quick disconnect device 140 and the inlet 150 of the check valve 154.

The outlet 156 of the check valve 154 is connected to a discharge pipe 170 at a lower end 174, and an upper quick disconnect device 180 is connected to the upper end 178 of the discharge pipe 170. A discharge extension tube 190 is connected to the inlet of the upper quick disconnect device 180. An interior adapter 194 is configured to fit over the top end 198 of the discharge extension tube 190 (if present) or the outlet of the upper quick disconnect device (if there is no discharge extension tube 190), and is configured to mate with an exterior adapter 196. The exterior adapter 196 is configured to connect to an elbow E that leads to an external effluent discharge system. Preferably, the elbow E is also connected to a shut off valve V, preferably a ball valve. Preferably, depending on the configuration of the particular tank, there may be one or more unions U to connect the shut off valve V to exterior plumbing for disposal of the effluent or supernatant (see also FIG. 3).

Preferably a rope 200 is attached to a convenient connection point in some lower portion of the interior components 100, such as the lower quick connect device 140, the motor 110 or the pump 120. If the rope 200 is attached to the lower quick disconnect device 140, the rope 200 must be connected in a manner that does not cause unintentional disconnection when the rope is pulled. For example, if the lower disconnect device 140 has opening levers that are moved upwardly to disconnect, it is presently preferred that the lower disconnect device 140 has a locking pin or locking flap to retain the opening levers in a lowered position, so that the disconnect device 140 does not disconnect if the rope 200 is secured to the lower disconnect device 140 and then is pulled upwardly.

Figure 2:
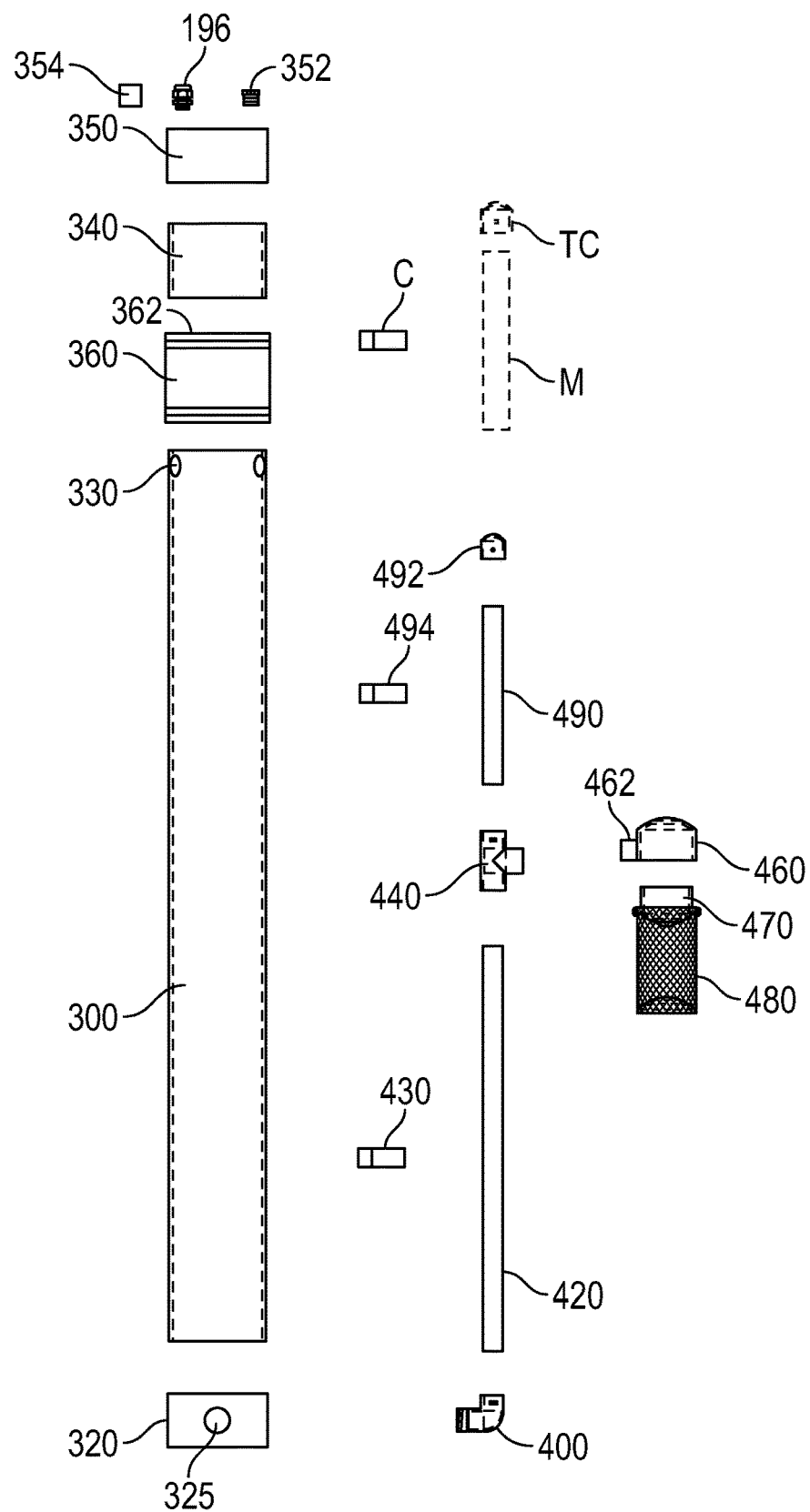
FIG. 2 is a side elevational exploded view of the exterior components of a presently preferred embodiment of a compact, extractable, self-contained decanter according to the present invention.

Referring to FIG. 2, shown is a side elevational exploded view of the exterior components of a presently preferred embodiment of a compact, extractable, self-contained decanter according to the present invention.

A housing 300, preferably formed from cylindrical polyvinyl chloride (PVC) pipe approximately 6 inches (approximately 15.24 centimeters) in diameter, has a bottom endcap 320 attached at the bottom. Optionally, the bottom endcap 320 has a hole 325 that can be plugged and unplugged for cleaning the bottom of the housing 300, or draining the housing 300.

A decanter riser elbow 400 is connected to the bottom endcap 320 so as to be in fluid communication with the interior of the housing 300 and form a decanter port. A decanter riser 420 is inserted into the elbow 400 and rises vertically. A decanter riser clamp 430 can be attached to the housing 300 to secure the decanter riser 420 to the housing 300. A tee joint 440 is preferably mounted on top of the decanter riser 420. A decanter intake 460 can be received in the horizontal portion of the tee joint 440, and a ball check valve assembly 470 is attached to the decanter intake 460. Optionally, a single layer vertical mesh screen 480 is attached to the ball check valve assembly 470. A decanter riser extension 490 is preferably attached to the upper vertical portion of the tee joint 440, and has a decanter top 492. A decanter riser extension clamp 494 can be attached to the housing 300 to secure the decanter riser extension 490 to the housing 300. Similarly, a decanter riser clamp 430 can be attached to the housing 300 to secure the decanter riser 420 to the housing 300.

Preferably the length of the decanter riser 420 and the tee joint 440 are set so that the decanter intake 460 sucks in supernatant from a level of wastewater in the tank that is beneath the surface of the wastewater (so as to avoid sucking in fats, oils, foam, and other floating materials) and above the settled layers after the settling step has completed and the decanting step begins (see below). Because the supernatant is sucked in from a level that has clear supernatant, especially if aerobic and anaerobic treatment and settling have already been performed (such as described below in connection with the embodiment with a pre-react zone director), it is not necessary also to provide filters inside the housing 300. This avoids the problems and frequent servicing caused by blocked filters in prior devices.

Of course, the tee Mint 440, decanter riser extension 490, decanter top 492 and decanter riser extension clamp 494 could be replaced by an elbow if the decanter riser 420 is long enough for the decanter intake to suck in supernatant at the right wastewater level and the decanter riser clamp 430 is sufficiently strong to retain the decanter riser 420, decanter intake 460, ball check valve assembly 470 and vertical mesh screen 480 in place when the decanter is being removed for servicing or repair.

Preferably the top of the housing 300 has handling apertures 330. A top segment 340 is airtightly attached to a top end cap 350. The top end cap 350 has a priming port (not shown) that can be airtightly sealed by a plug 352. Preferably, a cord grip 354 is attached to the top end cap 350. The exterior adapter 196 airtightly extends through the top end cap 350. Also, preferably the motor has an electrical cord (not shown) that airtightly passes through the top end cap 350 as well, and extends all the way down the housing 300 to the motor 110.

Preferably the top segment 340 is removably attached to the housing 300 by a rubber sleeve coupling 360 secured in place by circumferential steel bands 362, or by some other means for coupling them with an airtight seal, without twisting the cover by more than approximately 180 degrees. Coupling the top segment 340 with an airtight seal to the housing 300 without twisting more than 180 degrees is a non-twist airtight coupling. When the rubber sleeve coupling 360 is removed and the top segment 340 is removed, a rope can be threaded through the handling apertures 330 to lift the entire housing 300 and all interior components 100 and the decanter riser 420, decanter intake 460 and other exterior components.

A mounting pipe N is preferably installed in an interior portion of the tank, and has a top T. The interior portion of the tank includes all surfaces on the interior of the tank, including (without limitation) the top interior surface of the tank, any pipe or other structure that is inside the tank, and the interior surface of the cover for any access opening for the tank. A clamp C is preferably attached to the top segment 340 that can attach to the mounting pipe N, to secure the decanter assembly in an operating position, preferably a vertical position.

Figure 3:
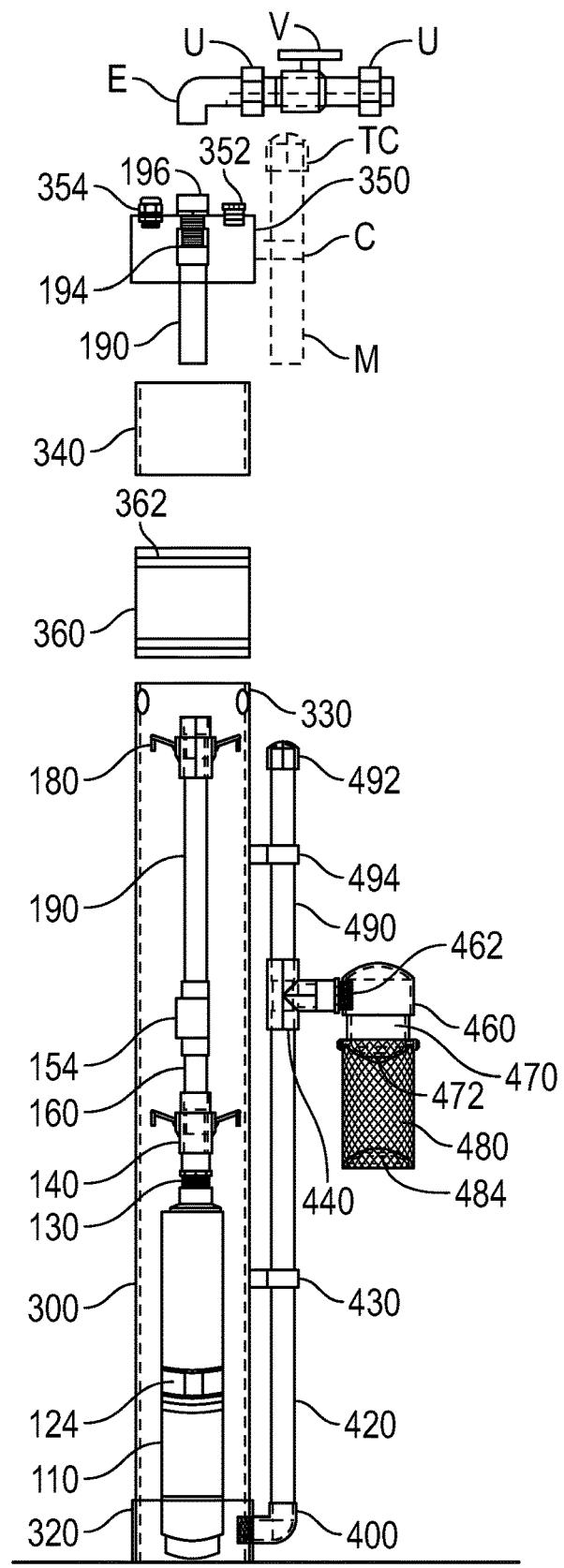
FIG. 3 is a side elevational assembled cutaway view of a presently preferred embodiment of a compact, extractable, self-contained decanter according to the present invention.

Referring to FIG. 3, shown is a side elevational partially assembled cutaway view of a presently preferred embodiment of a compact, extractable, self-contained decanter according to the present invention, showing how the interior components 100 shown in exploded view in FIG. 1 are assembled and placed in the interior of the housing 300, with the motor 110 placed in the bottom of the interior of the housing 300, and showing in more detail how the top segment 340, preferably forming the top portion of the interior of the housing, can be placed abutting the top end of the housing 300 (which is the top opening of the housing), and then the rubber sleeve coupling 360 can be placed over the joint and made watertight by sealing with the circumferential steel bands 362. Of course, if a different method of coupling with an airtight seal, without twisting more than 180 degrees, the top end cap 350 is used, the top end cap 350 can be mounted directly on the housing 300, so that the top portion of the interior of the housing 300 becomes the top of housing 300. Of course, the coupling to form an airtight seal, without twisting more than 180 degrees, of the top end cap 350 to the housing (or the top segment 340) is preferred because at least the power cord for the motor (not shown) preferably passes through the top end cap 350 and would be twisted if the airtight sealing required twisting of the top end cap 350 by more than 180 degrees. Also shown in greater detail is how the discharge extension tube 190 joins with the interior adapter 194 on the interior of the top end cap 350, and how the interior adapter 194 joins with the exterior adapter 196. The plug 352 for the priming port is also shown extending through the top end cap 350. The cord grip 354 is shown attached to the top end cap 350 so as to provide a place for a cord to engage with the entire decanter assembly.

Figure 4:
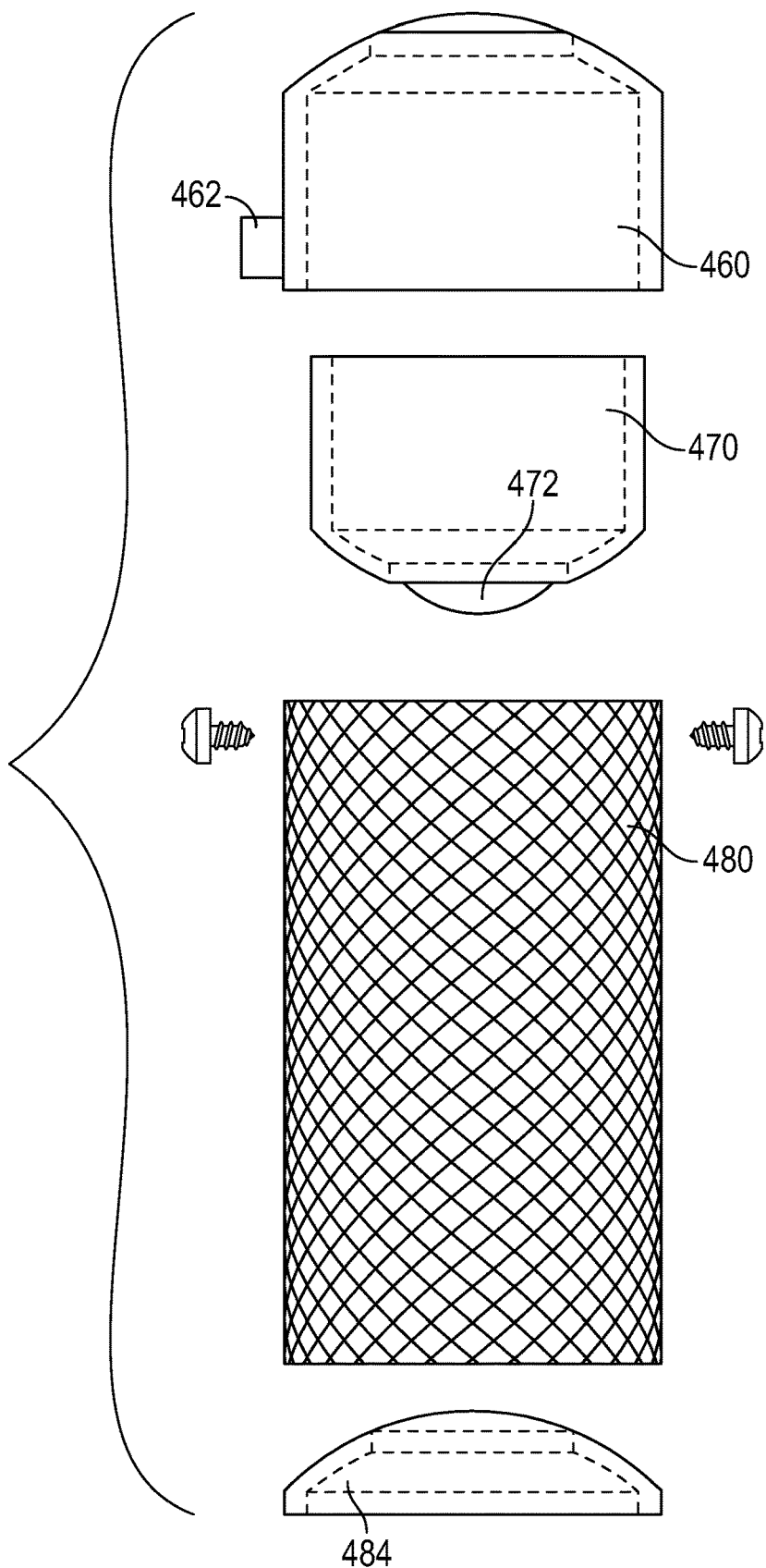
FIG. 4 is a side elevational exploded view of the decanter intake mesh screen of a presently preferred embodiment of a compact, extractable self-contained decanter according to the present invention.

Referring to FIG. 4, shown is a side elevational exploded view of the decanter intake 460, a ball check valve assembly 470, and the optional vertical mesh screen 480 of a presently preferred embodiment of a compact, extractable self-contained decanter according to the present invention. The vertical mesh screen 480 is preferably only of a single layer, is external to the decanter intake 460, and consists only of vertical portions. Preferably the vertical mesh screen 480 is approximately cylindrical and is retained in place by being screwed into the ball check valve assembly 470 by two short screws that do not penetrate through the walls of the ball check valve assembly 470. In this manner, the mesh screen 480 blocks larger solids from reaching the ball check valve assembly 470 and the decanter intake 460. Preferably holes in the mesh screen are between 1/16 inch (approximately 0.15875 centimeters) and ½ inch (approximately 1.27 centimeters), and preferably ⅛ inch (approximately 0.3175 centimeters), and preferably no filters are used inside the decanter. Also, as can be seen, a solid bottom 484 is attached to the vertical mesh screen 480, so that all portions of the mesh screen 480 are vertical. FIG. 4 also shows how the decanter intake 460 is attached to the tee 440 by a projecting member 462. FIG. 4 also shows the ball 472 of the ball check valve 470, which operates very similarly to the ball check valve of U.S. Pat. No. 6,423,214 B1 to Lindbo, which is incorporated herein by reference. The ball 472 in the ball check valve 470 is denser than supernatant, but can be lifted when the motor 110 is turned on, so the ball check valve 470 allows sucking in of supernatant when the motor 110 turns on during decanting (which would be after settling creates a supernatant layer), but the ball sinks and keeps solids from entering the decanter intake 460 during an anoxic cycle, when the microbiological processes create bubbles that could "lift" solids into the decanter intake 460, as well as during an aeration cycle, when the aerators 46 (see FIG. 5) also could "lift" solids into the decanter intake 460.

Because the mesh screen 480 is only vertical, solids in the wastewater are not retained on the mesh screen 480 by gravity, and will fall away if the pump motor 110 stops. Also, during the aeration portion of the wastewater treatment cycle (see below), the turbulence generated by the diffusers 46 will dislodge any solids that are adhering to the vertical mesh screen 480. Thus, the mesh screen 480 is self-cleaning. For any debris that is not removed by self-cleaning, the housing 300 only needs to be lifted sufficiently to expose the mesh screen 480 above the wastewater level, and then the mesh screen 480 can be sprayed with a hose or other device to clean it further. This ability to clean the mesh screen 480, and the lack of filters inside the housing 300, is much more advantageous than other decanter systems which have filters and float switches inside a housing, because the filters in other systems must be large enough to accommodate some clogging to minimize the frequency of filter cleaning, the filters must be submerged (usually on the bottom near the motor) with the float switches positioned above the filters, and the housing must be large enough to accommodate the larger filters and the float switches, so that the float switches must be removed before the filters (usually on the bottom near the motor) can be accessed or removed for cleaning, whether while in the housing or by removal from the housing first, and the housing is too large to fit through the access opening.

Figure 5:
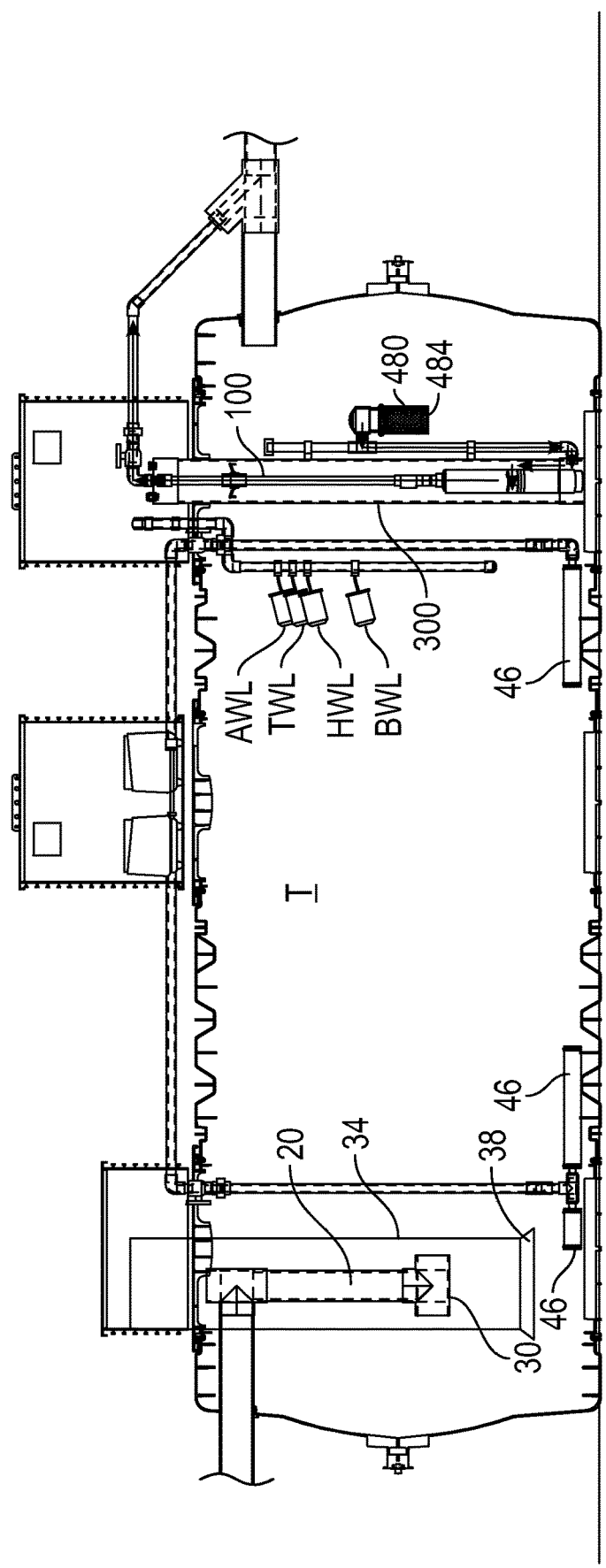
FIG. 5 is a side elevational cutaway view of a presently preferred embodiment of a device to treat influent according to the present invention.

Referring to FIG. 5, shown is a side elevational cutaway view of a presently preferred embodiment of a device to treat influent according to the present invention, installed in a tank T. As can be seen, the interior portions 100 of the assembly are inside the housing 300. Float switches (whose functions are described below) that are normally open are placed in the tank T but outside the decanter's housing 300, and therefore are switched on or off based on the level of wastewater in the tank, not on the level of supernatant in the housing 300 of the decanter. The float switches could be mounted on the outside of the housing if desired, for ease of servicing. If the float switches would project outward too far from the housing 300 to allow the entire assembly to be extracted through the access opening, the float switches could be removably mounted on the outside of the housing 300, so they could be removed prior to or during extraction, to allow the entire decanter assembly to be extracted through the access opening. If the float switches were mounted on the inside of the housing 300, the size of the housing 300 would need to be increased in order to provide sufficient room to accommodate the movement of the float (swing room) and other structures associated with the float switches, such as cords. This may make the housing 300 too large to extract through the access opening.

As explained in much more detail in U.S. Pat. No. 6,303,026 to Lindbo, incorporated herein by reference, influent flows into an influent gate housing 20 having an influent gate bottom 30 and is enclosed in a pre-react zone director 34 having a pre-react zone director flap or flare 38.

Replacing the existing influent mechanism in an existing tank with the influent mechanism described above allows the settling sludge blanket in the tank to act as a filter for the supernatant that is to be drawn into the decanter intake 460, as explained more fully in U.S. Pat. No. 6,303,026 to Lindbo, incorporated herein by reference.

Further, if the tank does not already have diffusers, diffusers 46 can be installed, such as the extractable diffusers disclosed in U.S. Pat. No. 7,526,848 to Lindbo, incorporated herein by reference.

Accordingly, when used together with the decanter of the present invention, and with installation of diffusers (if necessary), a single tank wastewater system that only performed settling can also perform aerobic, anaerobic (or anoxic) processing, and decant a supernatant of high quality.

Further, because the influent mechanism does not have any moving parts, then the decanter assembly contains all moving parts for the wastewater system except the float valves, and if the float valves are mounted on the housing 300 (including both directly, or indirectly such as by being mounted on the decanter riser 420, the decanter extension 490, the tee joint 440, or the decanter intake 460), then all moving parts for the entire wastewater system can be easily serviced or replaced or adjusted by removing the housing 300, together with the float valves mounted on the housing. As noted above, the aerators could be easily extracted for service or replacement as well.

When the top end cap 350 (with the discharge extension tube 190 extending through, and plug 352 in the priming port) is attached to the top segment 340, and they are joined to the housing 300 by the rubber sleeve coupling 360 and circumferential steel bands 362 (or other means for coupling them with an airtight seal without twisting more than 180 degrees), the interior of the housing 300 is closed, so that when the pump motor 110 is turned on, the pump 120 creates a vacuum inside the interior of the housing 300, to create powered suction of supernatant through the decanter intake 460, the decanter riser 420, the elbow 400 forming the decanter port, over the motor 110 to cool the motor, and into the pump inlet 124, so that the volume of fluid that can be pumped is not determined by ambient hydrostatic pressure (head). If the housing 300 were not closed, then the pump 120 would be limited to pumping the fluid at the maximum rate that can flow through the decanter port at the elbow 400, and the decanter intake 460—if the fluid were pumped at a higher rate, the pump 120 would eventually pump out all the fluid in the interior of the housing 300, until the pump intake 124 is left dry and air comes in, called cavitation. If the interior of the housing 300 does not have sufficient fluid for pumping at any time, then the plug 352 can be removed from the priming port, and sufficient fluid can be introduced into the interior of the housing 300 to allow the pump 120 to pump (at least enough fluid to submerge the intake 124).

Because there are no filters inside the housing, or between the decanter intake 460 and the motor inlet 124, clogged or blocked filters do not impede the flow of supernatant. Because the mesh screen 480 is located at a height below the surface and above the settled solids in the wastewater when the motor 110 is activated, the supernatant should be clear when the supernatant is sucked into the decanter intake. If there are solids in the supernatant at that time, the vertical mesh screen 480 should block them from entering the decanter intake 460.

Because the pump 120 and the motor 110 for the pump 120 are in the housing 300, and the decanter intake 460 is in fluid communication with the interior of the housing 300, the decanter assembly is self-contained.

Preferably, all the parts of the decanter assembly have a maximum dimension when assembled that is less than the maximum dimension of the access opening for the tank T, so that the entire decanter assembly can be removed through the access opening when the assembly is oriented in an extraction orientation, which is likely to be canted from the vertical because of the need to be able to extract the housing 300 and decanter intake 460 and mesh screen 480 (and possibly any float switches that may be mounted on outside of the assembly) without disassembly. In this manner, if the decanter intake 460, pump 120, motor 110, or other parts of the decanter assembly require servicing, the entire decanter assembly can be easily removed through the access opening, without needing to disconnect exterior pipes from the pump 110. Then any or all of the motor 110, the pump 120, the decanter intake 460, and other parts inside or outside the housing 300, can be easily removed through the access opening and accessed and serviced.

This could be accomplished, for example, by disengaging the exterior adapter 196 from the elbow E, disengaging the clamp C on the top end cap 350 from the mounting pipe M that is attached to the interior of the tank, and tying a rope to the cord grip 354. The entire decanter assembly then can be easily pulled by the rope through the access opening.

If necessary to service the interior components 100 of the decanter, the circumferential steel bands 362 around the rubber sleeve coupling 360 can be loosened, the rubber sleeve coupling 360 can be removed, and the top segment 340 can be lifted away from the housing 300. If the entire housing 300 (including all the interior components 100) or the decanter riser 420, decanter intake 460 or screen 480 need to be removed for servicing, then a rope can be engaged with the handling apertures 330 to pull out the housing 300 (including all interior components 100) and everything attached to the housing 300 of the decanter assembly. If only the interior components 100, such as the motor 110 or the pump 120 need to be removed for servicing, the upper quick disconnect device 180 can be disconnected, and then the rope 200 can be used to pull all the interior components 100 out of the housing 300. If the pump 120 or motor 110 must be replaced, the lower quick disconnect device 140 can be disconnected.

As can be seen from the above, preferably, the invention is an apparatus that includes the decanter described above and also contains an influent flow velocity reduction device. In order for a wastewater treatment process to perform the functions of flow equalization, aeration, settling, and effluent withdrawal within a single basin, it must be able to accept influent flows at all times. Two factors are critical to accommodating constant flows of influent without disruptions to the settling and decanting phases. First, turbulence due to splash energy must be mitigated. The influent gate housing disclosed in U.S. Pat. No. 6,303,026 B1 performs this task. Second, the influent must be delivered to the main reactor basin without upsetting the sludge blanket during settling and decanting. The pre-react zone director in U.S. Pat. No. 6,303,026 B1 does this by creating a large flow-through area to the biomass, thus reducing velocity. Additionally, the pre-react zone director has angled flanges at the bottom to direct influent downward and outward into the biomass in a laminar fashion.

The operation of a presently preferred embodiment of this invention is now described.

The process preferably operates six four hour cycles per day. Each four hour cycle preferably consists of two hours of aeration, one hour of settling, and one hour of effluent withdrawal (decanting). These phases are preferably controlled through the use of electronic timers, in conjunction with controls actuated by water level, such as float switches.

A. Aeration Phase

The aeration phase is normally the first two hours of the cycle. Oxygen is required by microorganisms that consume organic pollutants (BOD5) in typical residential wastewater. The oxygen requirement for BOD5 removal (The BOD5 indicates the amount of oxygen which bacteria and other microorganisms consume in a water sample during the period of 5 days at a temperature of 20° C. to degrade the water contents aerobically. BOD5 is thus an indirect measure of the sum of all biodegradable organic substances in the water) is calculated using traditional activated sludge process standards. Oxygen demand and mixing requirements are both met by supplying diffused air to the entire basin, including the pre-react zone.

LENGTH: 2 Hours
    TREATMENT: BOD5 Oxidation
      Mixing
      Nitrification
    INFLUENT: Yes
    AERATION: Yes
    SETTLE: No
    DECANT: No B. Settling Phase DESCRIPTION: The settling phase is normally the third hour of the cycle. During settling, solids-liquid separation occurs. The solids settle to the bottom of the basin, a thin scum layer forms on the surface, and a clear supernatant forms between the two.

LENGTH: 1 Hour
    TREATMENT: BOD5 Oxidation
      Solids/Liquids Separation
      Denitrification
    INFLUENT: Yes
    AERATION: No
    SETTLE: Yes
    DECANT: No C. Decant Phase
DESCRIPTION: The decant phase is normally the fourth hour of the cycle. During the decant phase, the decanter removes the supernatant from below the surface for discharge. If sludge removal is required, it will typically be done at the end of the decant phase.
  LENGTH: 1 Hour
  TREATMENT: BOD5 Oxidation
    Solids/Liquids Separation
    Denitrification
    Sludge Wasting
  INFLUENT: Yes
  AERATION: No
  SETTLE: Yes
  DECANT: Yes
Water Levels
  Because residential wastewater does not flow at a constant rate (peaks and valleys are normal throughout the day), various timing issues arise, which can be addressed with switches that determine water level (usually using floats and called "float switches"). The process of the present invention preferably deals with peak flows using water levels and water level switch overrides. From the top down, there are four water levels used as part of the presently preferred process:
    Alarm Water Level (AWL)
    Top Water Level (TWL)
    High Water Level (HWL)
    Bottom Water Level (BWL)
1. Bottom Water Level (BWL) Switch
In a typical activated sludge treatment facility, the volume of tankage and air required for treatment is determined by the amount of organic pollutants that need to be removed from the wastewater stream. In the presently preferred process, this is referred to as the Bottom Water Level (BWL). The water level in the reactor basin is never permitted to go below this level. Because the process accepts influent and decants effluent throughout the cycle, the water level will vary, but will always be above the BWL.
Should abnormally low flows be encountered, the water level may get lower than the BWL before the end of the Decant Phase, causing the bottom water level switch BWL to deactivate the decanter.
2. High Water Level (HWL) SWITH
The reactor basin capacity between the BWL and high water level HWL is sized to accept the design peak flows. The operating water level of the basin will normally lie between the BWL and HWL.
If abnormally high levels of flow are encountered, the water level may rise to the HWL before the aeration phase has completed. This causes the high water level switch HWL to cease aeration and to allow early settling, in case early effluent decanting become necessary.
3. Top Water Level (TWL)
The reactor basin capacity between the HWL and top water level TWL is sized to allow enough time for solids to settle in preparation for an early decant.
Should abnormally high levels of flow be encountered, the water level may rise to the TWL before the decant phase has begun. This causes the top level switch TWL to activate the decanter early.
4. Alarm Water Level (AWL)
If the water level in the reactor basin rises to the alarm water level AWL, there has been either a mechanical failure or flows have far exceeded the design peak flows.

An alarm level switch AWL will activate audio and visual alarms indicating immediate attention to the system is required.

Advanced Treatment

Along with providing extremely reliable secondary wastewater treatment, the process of this invention also meets most tertiary treatment standards without additional mechanical filtration or chemical addition.

Denitrification

In an environment absent of dissolved oxygen, naturally occurring bacteria use organic carbon in the form of incoming sewage to convert nitrate to nitrogen gas, carbon dioxide, and water. The process of this invention achieves high levels of denitrification by virtue of its cyclical nature and influent velocity reduction devices. During the aeration off phases of settle and decant, the reactor basin becomes anoxic (having very low dissolved oxygen). During this phase, raw sewage is introduced directly into a large percentage of the sludge blanket via the pre-react zone director, providing an ideal source of organic carbon.

Phosphorus Removal

Phosphorus Removal by the process of the present invention is by means of incorporation into cell tissue. It is estimated that the phosphorus content of the cell tissue is approximately one-fifth of the nitrogen content.

The process of this invention provides an environment that enables microorganisms in the sludge or mixed liquor (wastewater having suspended solids) to remove an excess amount of phosphorus required for growth. The influent gate housing and pre-react zone director provide an efficient method for the microorganisms to remove the phosphorus, because the influent wastewater is directed through the sludge layer during the air-off phase of the cyclic process. The unique components of the system of this invention mitigate influent flow velocities, to allow the activated-sludge layer to perform as a natural biological filter, thereby effectively extracting the organics and nutrients in the wastewater as they pass through the layer of sludge. This feature of the process of the present invention is non-mechanical and does not require the addition of chemicals. Further phosphorus removal is accomplished in the main reactor zone during all phases of the process.

In the anaerobic phase of the process of this invention, the influent's organic matter ferments into volatile fatty acids. These fatty acids initiate a biological selection process, which is beneficial to microorganisms, including acinebacter, which has large phosphorus storing capabilities. When aeration is turned on, the acinebacter bacteria will remove more phosphorus than metabolically required, thus further reducing the amount of phosphorus in the wastewater, without the use of chemicals.

Although the present invention has been disclosed in connection with the presently preferred embodiments described herein, a person of ordinary skill in the art of the invention would understand that there are other embodiments which fall within the spirit and scope of the invention. Accordingly, no limitations shall be implied or inferred in this invention except as may be specifically and explicitly set forth in the claims.

INDUSTRIAL APPLICABILITY

The present invention is applicable whenever it is desired to treat wastewater in tanks.

What is claimed is:

1. A compact decanter assembly extractable through an access opening in a tank for a fluid, the access opening having a maximum dimension, to decant a supernatant from below a surface of the fluid and above a settled layer in the fluid, wherein when the tank is in use, the surface of the fluid in the tank fluctuates in an operating range between a high fluid level and a bottom fluid level, comprising:
- a housing having a bottom, a hollow interior, and a top opening leading into a top portion of the interior, the housing being removably mountable in an operating position to an interior portion of the tank;
- a decanter riser elbow connected to the bottom of the housing so as to be in fluid communication with the hollow interior, forming a decanter port leading into the hollow interior;
- a removable cover configured to close the top opening to form an airtight seal;
- a decanter riser narrower than the housing inserted in the riser elbow, rising vertically when the tank is mounted in the operating position to the interior portion of the tank, in fluid communication with the hollow interior of the housing through the decanter port;
- a decanter intake in fluid communication with the decanter riser, wherein the decanter intake is positioned below the bottom fluid level when the housing is mounted in the operating position to the interior portion of the tank;
- wherein, when in an extraction orientation, the housing, the decanter riser and the decanter intake have a maximum combined dimension that is less than the maximum dimension of the access opening and are configured to be extractable though the access opening; and
- a pump having a pump motor removably placed inside the hollow interior of the housing, the pump being in disconnectable fluid communication at a pump outlet with a discharge line extending watertightly through the cover outside the housing, and the pump being in fluid communication with the interior of the housing at a pump inlet that is above the pump motor when the pump motor is placed in the housing and the housing is mounted in the operating position to the interior portion of the tank;
- whereby when the housing is mounted in the operating position to the interior portion of the tank and the cover sealingly closes the top opening and the pump is activated, the pump creates a vacuum in the hollow interior that sucks the supernatant through the decanter intake, the decanter riser, the riser elbow forming the decanter port, the interior of the housing, over the pump motor to cool the pump motor, and in through the pump inlet, without going through a filter, resulting in a decanter unfiltered fluid, and then pumps the decanter unfiltered fluid out the pump outlet and into the discharge line and outside the housing, at a rate that is independent of the hydrostatic pressure between the decanter intake and the level of the fluid.

2. A device to treat influent, comprising:
- a tank having a bottom and an access opening, the access opening having a maximum dimension, wherein when the tank is in use, the surface of the influent in the tank fluctuates between a high influent level and a bottom influent level;
- an influent gate housing having a bottom portion mounted in the tank to receive the influent;
- a pre-react zone director having a lower portion at least partially surrounding the influent gate housing, the pre-react zone director defining a main react zone inside the tank, but outside the pre-react zone director, wherein the lower portion of the pre-react zone director is spaced apart from the bottom of the tank and defines a contact zone between the lower portion and the bottom of the tank, whereby the pre-react zone director directs flow of the influent in a laminar fashion through the contact zone and into the main react zone;
- wherein the lower portion of the pre-react zone director comprises a flap, wherein the flap is an angled lip extending at least partially around the lower portion of the pre-react zone director;
- whereby the influent avoids disturbing any settling sludge in the main react zone and forms a supernatant by filtering through the settling sludge; and
- a compact decanter assembly extractable through the access opening, comprising:
  - a housing having a bottom, a hollow interior, and a top opening leading into a top portion of the interior, the housing being removably mountable in an operating position to an interior portion of the tank;
  - a decanter riser elbow connected to the bottom of the housing so as to be in fluid communication with the hollow interior, forming a decanter port leading into the hollow interior;
  - a removable cover configured to close the top opening to form an airtight seal;
  - a decanter riser narrower than the housing inserted in the riser elbow, rising vertically when the tank is mounted in the operating position to the interior portion of the tank, in fluid communication with the hollow interior of the housing through the decanter port;
  - a decanter intake in fluid communication with the decanter riser, wherein the decanter intake is positioned below the bottom fluid level when the housing is mounted in the operating position to the interior portion of the tank;
  - wherein, when in an extraction orientation, the housing, the decanter riser and the decanter intake have a maximum combined dimension that is less than the maximum dimension of the access opening and are configured to be extractable though the access opening; and
  - a pump having a pump motor removably placed inside the hollow interior of the housing, the pump being in disconnectable fluid communication at a pump outlet with a discharge line extending watertightly through the cover outside the housing, and the pump being in fluid communication with the interior of the housing at a pump inlet that is above the pump motor when the pump motor is placed in the housing and the housing is mounted in the operating position to the interior portion of the tank;
  - whereby when the housing is mounted in the operating position to the interior portion of the tank and the cover sealingly closes the top opening and the pump is activated, the pump creates a vacuum in the hollow interior that sucks the influent through the decanter intake, the decanter riser, the riser elbow forming the decanter port, the interior of the housing, over the pump motor to cool the pump motor, and in through the pump inlet, without going through a filter, resulting in a decanter unfiltered fluid, and then pumps the decanter unfiltered fluid out the pump outlet and into the discharge line and outside the housing, at a rate that is independent of the hydrostatic pressure between the decanter intake and the level of the fluid.

3. A compact decanter assembly according to claim 1, wherein the decanter intake has a single layer vertical screen.

4. A compact decanter assembly according to claim 1, wherein said removable cover is attached over said top opening of said housing by a non-twist airtight coupling.

5. A device to treat influent according to claim 2, wherein float switches to detect influent levels in said tank are mounted on the housing.

6. A compact decanter assembly according to claim 1, wherein float switches to detect fluid levels in said tank are mounted on the housing.

7. A compact decanter assembly according to claim 1, further comprising a bottom endcap attached to the bottom of the housing, wherein the decanter riser elbow is connected to the bottom endcap.

8. A device to treat influent according to claim 2, further comprising a bottom endcap attached to the bottom of the housing, wherein the decanter riser elbow is connected to the bottom endcap.

9. A compact decanter assembly according to claim 1, further comprising a ball check valve assembly attached to the decanter intake, wherein a ball in the ball check valve assembly is denser than the supernatant, whereby the ball is lifted when the motor is turned on during decanting the supernatant, so the ball check valve assembly allows sucking in of the supernatant during the decanting, but the ball sinks and keeps solids from entering the decanter intake when bubbles form during an anoxic cycle or aeration cycle.

10. A device to treat influent according to claim 2, further comprising a ball check valve assembly attached to the decanter intake, wherein a ball in the ball check valve assembly is denser than the influent, whereby the ball is lifted when the motor is turned on during decanting the influent, so the ball check valve assembly allows sucking in of the influent during the decanting, but the ball sinks and keeps solids from entering the decanter intake when bubbles form during an anoxic cycle or aeration cycle.

\* \* \* \* \*